Patented Apr. 15, 1947

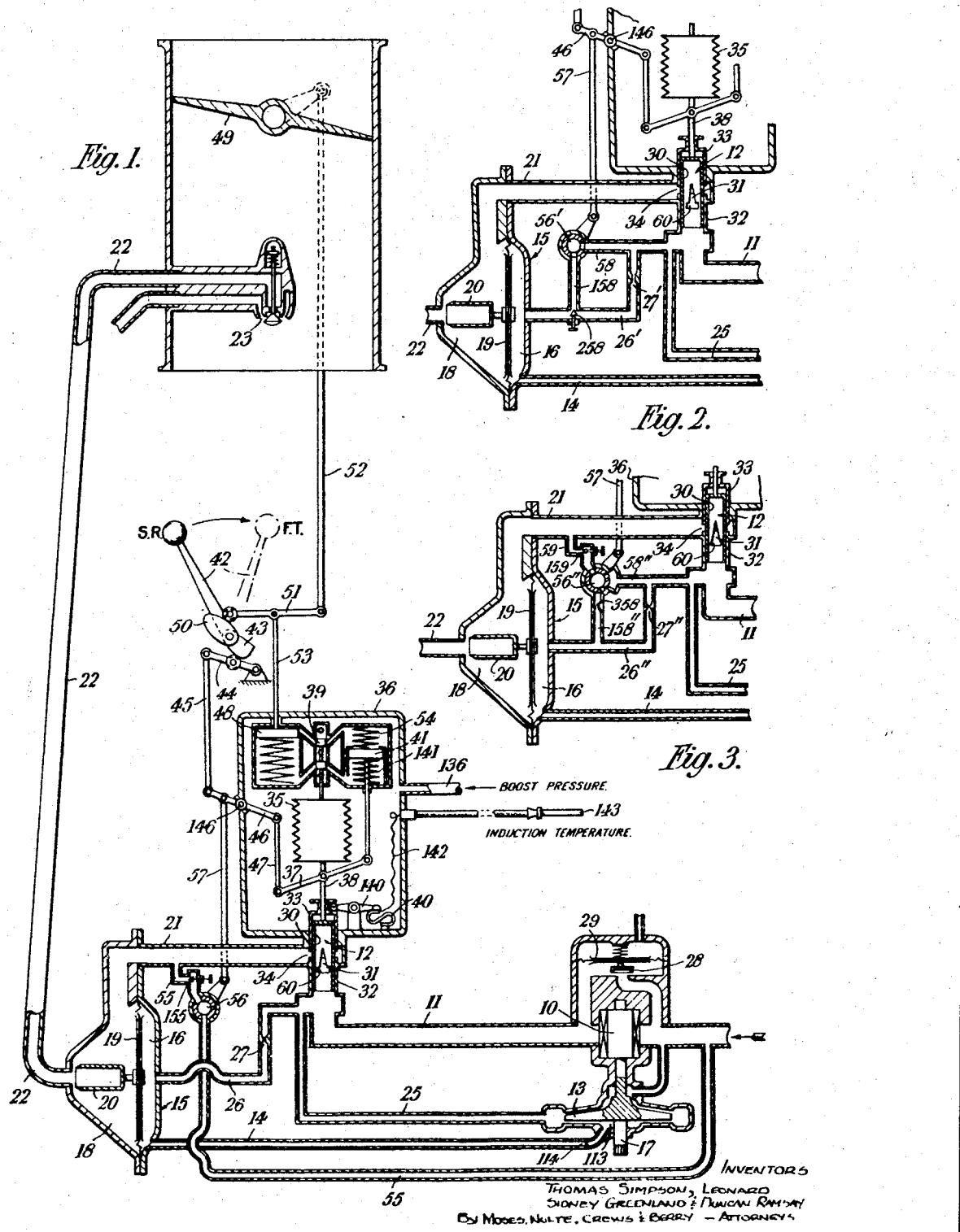

2,419,171

UNITED STATES PATENT OFFICE 2,419,171

REGULATING DEVICE FOR CONTROLLING THE SUPPLY OF FUEL TO INTERNAL-COMBUSTION ENGINES

Thomas Simpson, Kenilworth, Leonard Sidney Greenland, Weston-super-Mare, and Duncan Ramsay, North Wembley, England, assignors to H. M. Hobson Limited, London, England Application April 28, 1944, Serial No. 533,120
In Great Britain April 8, 1943

7 Claims. (Cl. 123—119)

This invention relates to fuel injection systems for aircraft engines of the type in which the fuel is fed to the engine through a fuel-metering valve having a metering orifice the effective area of which is varied, under the control of a variable datum boost control device, as a desired function of boost pressure, and across which the pressure difference developed by an engine-driven centrifugal impeller (or a fraction thereof) is maintained. Such an impeller has the property of developing a pressure difference proportional to the square of the engine speed; and as the rate of flow of fuel through a sharp edged metering orifice is proportional to the square root of the pressure difference across it, the rate of flow of fuel is accordingly varied in accordance with engine speed.

The object of the invention is to provide in a system of this character, an adjustment of the mixture strength to suit the requirements at slow running.

This is achieved by means of a supplementary valve mechanically connected to the pilot's throttle lever, movement of said valve being ineffective to vary the fuel flow over the major portion of the range of movement of the throttle lever, but the valve serving to effect a change in mixture strength on movement of said lever into the slow running position.

Three specific forms of injector according to the invention will now be described in detail, by way of example, with reference to the accompanying drawing, in which:

Fig. 1 is a diagrammatic layout of a fuel injection system including the first embodiment, and Figs. 2 and 3 are similar diagrams showing respectively those portions of the apparatus according to Fig. 1 which are modified in the second and third embodiments.

Like reference numerals indicate like parts throughout the figures.

The injector shown in Fig. 1 is generally of the character described in United States Patent No. 2,374,844. Fuel is fed by an engine driven feed pump 10 along a pipe 11 to the entry side of a fuel metering orifice 12. 13 is a centrifugal impeller, mounted on the same drive shaft 17 as the pump 10. The eye 113 of the impeller is connected by a pipe 14, embodying a restriction 114, with the rear section 16 of a diaphragm chamber 15. The front section 18 of the chamber, which is separated from the rear section 16 by the diaphragm 19 carrying a flow regulating valve 20, communicates by a pipe 21 with the exit side of the metering orifice 12 and by a pipe 22 with an injector nozzle 23 in the induction pipe 24. The discharge ring of the impeller 13 communicates with the entry side of the metering orifice by a pipe 25, and a pipe 26 embodying a restriction 27 connects the entry side of the metering orifice with the rear section 16 of the diaphragm chamber.

The diaphragm 19 adjusts the position of the regulating valve 20 so that the pressures within the sections 16, 18 of the diaphragm chamber are equal. The pressure drop across the metering orifice 12 is therefore maintained equal to that across the restriction 27, which is some fraction of the pressure difference developed by the impeller 13, and therefore proportional to the square of the engine speed. The rate of flow of fuel through the metering orifice will therefore be proportional to engine speed. A relief valve 28 controlled by a spring 29 enables excess fuel to return to the suction side of the feed pump 10.

The fuel-metering orifice 12 consists of a valve in the shape of a hollow cylinder 30 containing a roughly triangular port 31. This valve 30 slides inside a split sleeve, one part 32 of which is fixed and the other 33 movable and positioned so that there is always a distance between the two portions, known as the slot 34. Movement of the valve 30 and its port 31 in relation to the slot 34 varies the area of the metering orifice. The valve 30 is slidable in the sleeve under the control of a stack of evacuated capsules 35 disposed in a chamber 36 subject to boost pressure entering through a pipe 136 and forming part of a variable datum boost control device, so that the area of the metering orifice will be varied in accordance with changes in boost pressure.

The variable datum boost control device is of the kind described in U. S. Patent No. 1,995,800. The pilot's throttle lever 42 operates a variable datum cam 43 which, in turn, acts through linkage members 44, 45, on the left hand end of a lever 46 pivoted on a fixed pivot 146. The right-hand end of this lever is connected by a link 47 to the left-hand end of a cross link 37, centrally pivoted to a rod 38 connecting the capsules 35 and the valve 30. As the pilot's throttle lever is moved the cross link 37 is rocked about its right hand end, thereby adjusting the valve 30 and operating on the capsules 35, thereby displacing a relay valve 39 and causing a servo piston 48 to adjust the position of the throttle valve 49, through the agency of piston rod 53 and links 51, 52, so as to establish the required boost. The link 52 is shown broken in Fig. 1 and during this servo adjustment of the throttle the link 51 pivots about its left-hand end which remains abutting against cam 50. The movable part 33 of the sleeve moves, through the agency of a rocking lever 140, under the control of a Bourdon tube 40 which is connected by a flexible capillary tube 142 to a thermometer bulb 143, exposed to the temperature in the induction manifold (not shown). The whole assembly is filled with liquid having a high coefficient of thermal expansion and therefore responds to changes of temperature in the induction manifold, and so provides a correction in the area of the metering orifice for changes in induction temperature. In addition a resetting piston 41 is provided which, above full throttle height, moves progressively downwards against its lower spring 141 as the boost falls off, so effecting a compensating reduction in the area of the metering orifice. Downward movement of the relay valve 39, due to a fall in boost, directs pressure oil to the upper ends of the cylinders housing the pistons 48, 41 and connects the lower ends of these cylinders to exhaust. Below full throttle height the piston 48 is free to move down but the spring 141 prevents downward movement of the resetting piston 41. When full throttle height is reached, the piston 48 will be at the bottom of its cylinder and thereafter the oil pressure on top of piston 41, due to a further fall in boost, will overpower spring 141 and cause piston 41 to move down.

The area of the fuel metering orifice is thus variable to take account of changes in boost pressure and induction temperature.

The pilot's throttle lever 42 carries a cam 50 which, as the lever is moved from the slow running (S. R.) to the full throttle (F. T.) position effects a small mechanical opening of the throttle valve 49 through the agency of the links 51, 52, the link 51 pivoting about its point of attachment to the piston rod 53 of the servo piston 48. Thereafter the servo piston 48 acts, as described in U. S. Patent No. 2,376,690, to effect the major part of the opening movement of the throttle, by rocking the link 51 about its left hand end.

In modern aero engines with large valve overlap, a phenomenon known as boost reversal occurs at small throttle openings and for this reason the servo motor of the boost control is deliberately placed out of action and the throttle operated mechanically over this range as described in Patent No. 2,376,690. To this end, as the pilot's lever 42 is moved to close the throttle, the servo piston 48 is caused to come to a stop at the upper end of its cylinder as shown, shortly before the lever 42 reaches the slow running position. Under these conditions, as the boost rises again at very small throttle openings due to boost reversal, and the relay valve 39 is moved down, the resetting piston 41 operates against its upper spring 54 to correct the fuel flow, moving up against said spring 54 under the action of pressure oil fed to its underside by the downward movement of the relay valve 39.

The apparatus thus continues in the range of boost reversal to maintain the relationship between the area of the metering orifice and the boost pressure determined by the shape of the slot 31 in the valve 30. Under these conditions, however, the boost pressure is no longer a true measure of the air consumption of the engine, and it is necessary to weaken the mixture. This is achieved by allowing a portion of the fuel to bleed away through a pipe 55 connecting the pipe 21 and the suction side of the pump 10. In the pipe 55 is a valve 56 operated by a link 57 from the lever 46. The valve 56 is thus mechanically coupled to the pilot's throttle lever 42 and is maintained open during the range of boost reversal—i. e. when the lever 42 is at or near the slow running position—to allow part of the fuel to bleed away and so weaken the mixture. In all other positions of the pilot's lever, however, the valve 56 is closed. An adjustable valve 155 in pipe 55 serves to vary the amount of fuel which is bled away through pipe 55 at slow running.

An alternative arrangement for weakening the mixture in the range of boost reversal is shown in Fig. 2. Here the valve 56 linked to the pilot's lever controls a branch pipe 58, 158 leading from the entry side of the metering orifice to the rear section 16 of the diaphragm chamber. At or near slow running the valve 56 is open to allow fuel to bleed through the branch pipe 58, 158 and so increase the pressure in the rear section 16 of the diaphragm chamber, which results in a reduction of the pressure difference across the metering orifice and so weakens the mixture strength. In all other positions of the pilot's lever the valve 56 is closed. An adjustable valve 258 serves to vary the amount of fuel bled away through the branch pipe 58, 158 at slow running.

In other types of engines it is necessary to enrich the mixture at slow running. To this end, the arrangement shown in Fig. 3 may be used. In this case the valve 56" at slow running opens a conduit 58", 59 in parallel with the metering orifice and so enriches the mixture. An adjustable valve 159 controls the rate of flow of fuel through conduit 59. As the pilot's lever is moved to open the throttle, the pipe 59 is shut off and the enrichment cut out. When the pilot's lever is in the cruising range, the valve 56" opens the branch pipe 58", 158" to weaken the mixture. The rate of flow of fuel through the branch pipe is controlled by a restriction 358. As the lever moves beyond the cruising range the branch pipe is closed again, to return to rich mixture.

In all of the embodiments an extra rich mixture is obtained for take off and climb, with the pilot's lever in the full throttle position, by virtue of the enlargement 60 at the lower end of the slot 31 in the valve 30 coming into register with the slot 34.

What we claim as our invention and desire to secure by Letters Patent is:

1. A fuel injection device for aircraft engines, comprising a main fuel delivery pipe, a fuel pump for feeding fuel along said pipe, a mixture strength control means comprising, a fuel-metering valve in said pipe defining a variable-area fuel metering orifice, an engine driven centrifugal impeller, a connection from the discharge ring of said impeller to the inlet side of said orifice, means for maintaining across said orifice a pressure difference proportional to that developed by said impeller, a variable datum boost control operatively connected to said metering valve so as to vary the effective area of its metering orifice as a desired function of boost pressure, a throttle valve, a pilot's throttle lever movable between a slow running and a full throttle position and operating, when so moved, to vary the datum of said boost control, control means interposed between said lever and said throttle valve for operating said throttle valve on movement of said lever, said control means being adjustable by said boost control device so as to prevent excessive opening of said throttle valve, a supplementary fuel conduit, exposed at one end to the pressure at the exit side of the metering orifice and connected at the other end to the main fuel delivery pipe in advance of the inlet of said metering orifice and a valve operatively connected to said pilot's throttle lever and serving to control the flow of fuel through said supplementary conduit, said last mentioned valve operating to vary the conditions of flow through said supplementary conduit, and thereby to change the mixture strength, only on movement of the pilot's lever into the slow running position.

2. A fuel injection device as claimed in claim 1, in which the supplementary fuel conduit is constituted by a bleed pipe for bleeding fuel from the main fuel delivery pipe beyond the exit of the metering orifice, the valve controlling said bleed pipe being arranged to be open when the pilot's lever is in the slow running position and to close on movement of the pilot's lever from said slow running position.

3. A fuel injection device as claimed in claim 1, in which the supplementary fuel conduit is constituted by a bleed pipe communicating at one end with the main fuel delivery pipe at the exit side of the metering orifice and at the other end with said delivery pipe at the inlet side of the main fuel pump, and in which the valve controlling the flow of fuel through said bleed pipe is arranged to be open when the pilot's lever is in the slow running position and to close on movement of the pilot's lever from said slow running position.

4. A fuel injection device as claimed in claim 1, in which the supplementary fuel conduit is constituted by a bleed pipe for bleeding fuel from the main fuel delivery pipe at the entry of the metering orifice, the valve controlling said bleed pipe being arranged to be open when the pilot's lever is in the slow running position and to close on movement of the pilot's lever from said slow running position.

5. A fuel injection device as claimed in claim 1, comprising a chamber having two sections one of which communicates with the main fuel delivery pipe on the exit side of the metering orifice, a diaphragm separating the two sections of said chamber, and a connection between the other section of said chamber and the eye of the impeller, and in which the supplementary conduit is constituted by a bleed pipe connecting the inlet of the metering orifice with said other section of the chamber, and the valve controlling the flow of fuel through said bleed pipe is arranged to be open when the pilot's lever is in the slow running position and to close on movement of the pilot's lever from said slow running position.

6. A fuel injection system as claimed in claim 1, in which the supplementary fuel conduit is arranged in parallel with the metering orifice, and in which the valve controlling said conduit is arranged to be open when the pilot's lever is in the slow running position and to close when said lever is moved from the slow running position.

7. A fuel injection system as claimed in claim 1, in which the supplementary fuel conduit is arranged in parallel with the metering orifice, and comprising a bleed pipe for bleeding fuel from said supplementary conduit, the valve controlling the flow of fuel through the supplementary conduit also controlling the flow of fuel through the bleed pipe, and being arranged to permit of the flow of fuel through the supplementary conduit to the exit side of the metering orifice only when the pilot's lever approaches its slow running position and to permit of fuel being bled from the inlet side of the metering orifice through the bleed pipe only when the pilot's lever occupies an intermediate position corresponding to cruising speed of the engine.

THOMAS SIMPSON.
LEONARD SIDNEY GREENLAND.
DUNCAN RAMSAY.

REFERENCES CITED

The following references are of record in the file of this patent:

UNITED STATES PATENTS

| Number | Name | Date |
|---|---|---|
| 2,136,959 | Winfield | Nov. 15, 1938 |
| 2,150,081 | Schorsch | Mar. 7, 1939 |
| 1,663,936 | Cozette | Mar. 27, 1928 |
| 2,374,844 | Stokes | May 1, 1945 |
| 2,341,257 | Wunsch | Feb. 8, 1944 |

FOREIGN PATENTS

| Number | Country | Date |
|---|---|---|
| 523,895 | England | July 25, 1940 |

Certificate of Correction

Patent No. 2,419,171.   April 15, 1947.

THOMAS SIMPSON ET AL.

It is hereby certified that error appears in the printed specification of the above numbered patent requiring correction as follows: Column 4, line 54, claim 1, strike out the article "a" before "mixture"; and that the said Letters Patent should be read with this correction therein that the same may conform to the record of the case in the Patent Office.

Signed and sealed this 15th day of July, A. D. 1947.

[SEAL]

LESLIE FRAZER,
*First Assistant Commissioner of Patents.*